Patented June 14, 1949

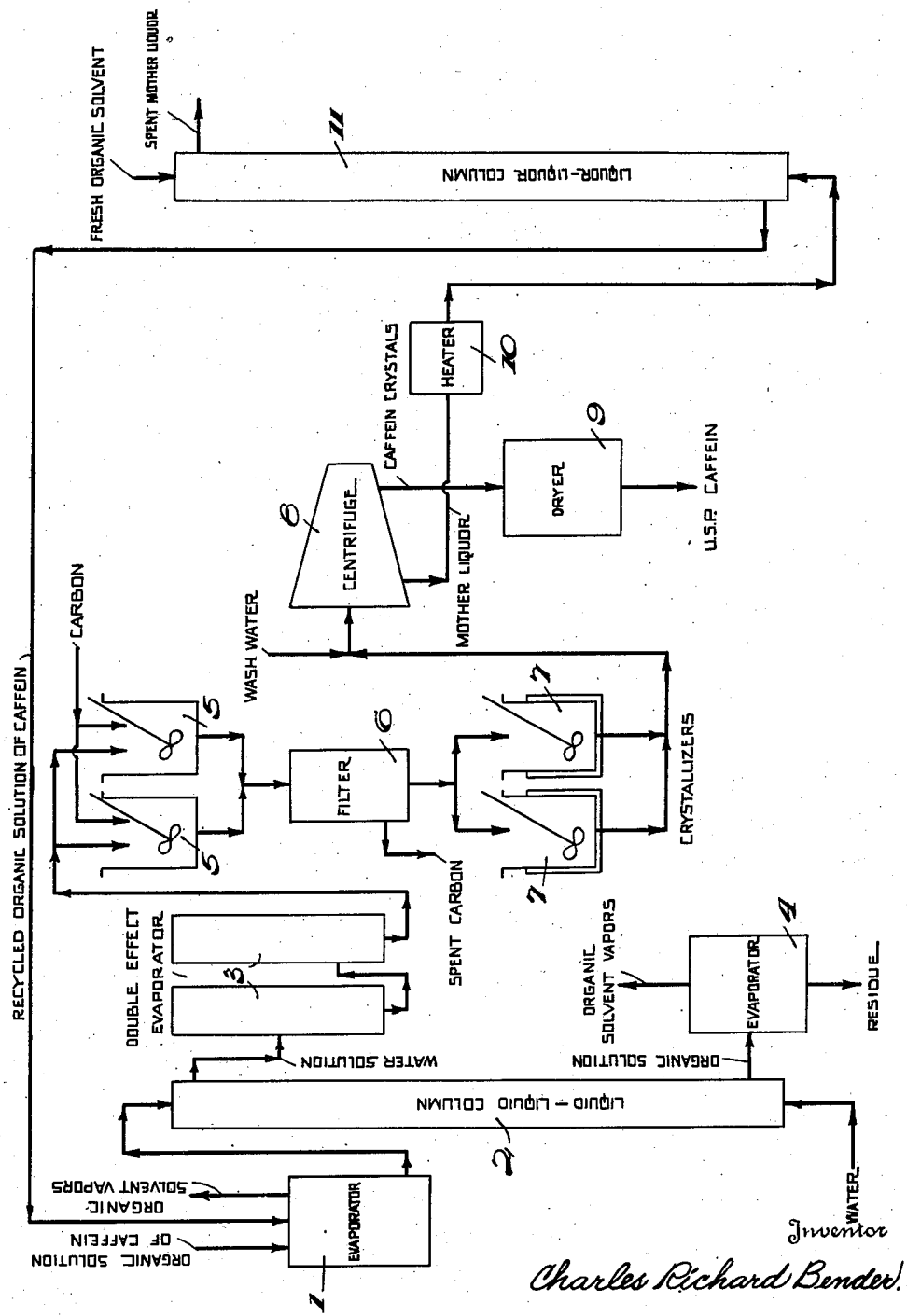

2,472,881

UNITED STATES PATENT OFFICE 2,472,881

PROCESS OF RECOVERING CAFFEINE

Charles Richard Bender, Teaneck, N. J., assignor to General Foods Corporation, New York, N. Y., a corporation of Delaware Application June 20, 1946, Serial No. 678,073

8 Claims. (Cl. 260—256)

The present invention relates to the recovery of caffein from its solutions in organic solvents, particularly such solvents as are used in the decaffeination of coffee beans, coffee extracts or other coffee products.

In the decaffeination of coffee as generally practiced, caffein is extracted from green beans along with oils, waxy materials and coloring matter by means of a hot chlorinated solvent such as trichlorethylene, carbon tetrachloride chloroform, etc. The bulk of the solvent is then recovered by evaporation and condensation and the remaining solution is steam distilled to recover the residual solvent, leaving an aqueous sludge containing crude caffein and water-soluble impurities in solution and certain water-insoluble impurities termed "coffee wax" in suspension. After lengthy standing of this sludge during which it is concentrated by application of heat, the coffee wax carrying a certain amount of entrained caffein is skimmed off and the remaining liquid is further concentrated prior to treatment with activated carbon and recovery of the caffein by crystallization.

As applied in practice, the foregoing procedure involved a series of tedious and costly manipulations and at best afforded yields which were far from satisfactory. Increasing the yield entailed recovering the caffein entrained in the wax by washing the latter with hot water and recycling the wash water. Similarly the mother liquor from the crystallization step had to be recycled if the residual caffein therein was not to be lost. However, such recycling resulted in a gradual increase of the impurities in the system to the point where the recovery of U. S. P. grade caffein became economically unsound and in fact impossible. Because activated carbon irreversibly adsorbs 10–14% of its dry weight of caffein, repeated carbon treatments in an effort to remove the impurities resulted in a steady decrease in yield. Moreover such decreased yield of caffein still was not of U. S. P. grade because of the presence of a contaminant known as "cafestol" derived from the coffee wax. This substance, remaining in solution with the caffein even after extended carbon treatment, is a sterol-like compound insoluble in water but highly soluble in concentrated caffein solutions. Accordingly the low yield of caffein obtained in practice, although unsatisfactory, was accepted as the best obtainable.

The present invention is directed to a procedure which for the first time makes possible the recovery of substantially all of the caffein in sufficiently pure form to meet U. S. P. standards. Broadly speaking, this procedure eliminates from the system both water-soluble and water-insoluble impurities contained in the original organic solution without attendant losses of caffein. To effect this selective elimination, I propose to first separate out the water-insolubles by transferring the caffein and water-solubles to solution in water and, after substantial removal of caffein therefrom, to then separate out the water-solubles by transferring the residual caffein back to solution in an organic solvent, the latter being preferably the same solvent as used for extraction of the coffee and the organic solution containing the residual caffein being returned to the organic starting solution.

I prefer to separate out the water-insolubles by liquid-liquid contact of the organic starting solution with water in any suitable apparatus such as an extraction column, a centrifugal extractor, a mechanical mixer associated with appropriate settling tanks, etc. When the amount of water used is such as to remove substantially all the caffein from the starting solution, the result is a caffein solution of less than 10% which is sufficiently dilute to render the cafestol insoluble therein. Thus the caffein and other water-solubles are transferred from the organic solvent to the water and the cafestol, coffee wax and other water-insolubles are left behind in the organic solvent. The introduction of cafestol into the system is avoided at the outset and hence the possibility of its accumulation in the system is entirely eliminated regardless of the extent of subsequent recycling of residual caffein-containing solutions. Similarly elimination of the coffee wax at the outset does away with the former time-consuming operation of allowing the wax to separate out on standing, results in more efficient removal of the wax than could be secured by skimming as heretofore practiced, and avoids the steps of washing of the wax with water and recycling of the wash water heretofore performed to recover caffein entrained with the wax.

Similarly I prefer, after recovery of the bulk of the caffein from the aqueous solution in the usual manner, to separate out the water-solubles by liquid-liquid contact of the remaining aqueous solution with an organic solvent in any suitable apparatus such as those mentioned above. Consequently the residual caffein is transferred from the aqueous solution to the organic solvent and the other water-solubles being largely insoluble in the organic solvent are left behind. Recovery of all but a minute fraction of the residual caffein through recycling of this solvent is possible without reentry of appreciable quantities of impurities into the system. The gradual building up of impurities in the system as heretofore experienced is thereby avoided, as is also the former wasteful practice of discarding a portion of the residual caffein-containing liquor. Moreover the concentration of impurities in the system is so low that the extent of carbon treatment can be reduced beyond the minimum heretofore necessary under even the best conditions. As a consequence the amount of caffein lost through irreversible adsorption on the carbon is reduced correspondingly.

The invention will be more fully understood with the aid of the following description taken in connection with the accompanying flow sheet, it being understood that the operations shown are given by way of example only and are not to be construed as limiting the scope of the invention, reference being had for the latter purpose to the appended claims.

The solution of caffein in the organic solvent, for example, trichlorethylene, when obtained from the decaffeination of green coffee will usually contain about 0.1% caffein and 0.05% wax and other impurities. This solution flows into the solvent evaporator 1 where the bulk of the solvent is driven off and recovered by suitable condensing equipment (not shown). The concentrated solution containing approximately 2.5% caffein and 1% total impurities is pumped while hot from the evaporator 1 to the top of extraction column 2 where it is contacted with hot water introduced at the bottom. The column should be maintained at a temperature above the melting point of the coffee wax to prevent its solidification. The hot water leaving the top of column 2 contains substantially all of the entering caffein and water-soluble impurities in solution and is sent to a double-effect evaporator 3 where it is suitably concentrated. The organic solvent containing the wax, cafestol and other water-insoluble impurities passes from the bottom of column 2 to an evaporator 4 where the solvent is evaporated and the residue discarded.

The concentrated solution leaving evaporator 3 is pumped to a pair of mixing tanks 5 containing activated carbon which are operated alternately to permit continuous treatment. This treatment comprises contacting the solution for half-hour periods with about 0.5 lb. of carbon per gallon of solution which removes practically all impurities along with about 2.5% of the entering caffein. From these tanks the treated solution passes to a filter 6 where the spent carbon is removed. The filtrate then flows to a pair of water-cooled crystallizing tanks 7 which are operated alternately to enable continuous crystallization of the caffein. The crystallized caffein and mother liquor from the tanks 7 together with added wash water are separated in a centrifuge 8 and the caffein crystals are sent to a drier 9.

The diluted mother liquor containing approximately 3.5% caffein is heated in a heater 10 and pumped to the bottom of a column 11 in which it is contacted with fresh organic solvent introduced at the top, this solvent being preferably the same as that used in the starting solution. The column should be maintained at a temperature sufficiently high to prevent further crystallization of caffein. The amount of solvent should be sufficient to remove substantially all the caffein from the mother liquor, in which event spent mother liquor leaving the top of the column contains practically no caffein and is sent to waste, while the caffein-containing solvent leaving the bottom is returned to evaporator 1.

While I have described my invention with particular reference to solutions of caffein in organic solvents derived by contacting coffee directly with such solvents, it will be understood that the invention is also applicable to solutions of caffein in organic solvents derived by contacting aqueous extracts of coffee with such solvents. It will be further understood that the invention is not restricted to the details of equipment and operation described and accordingly reference should be had to the appended claims for a definition of the limits thereof.

What is claimed is:

1. A method of recovering caffein from a solution obtained by organic solvent extraction of coffee products which comprises contacting the solution with water to separate the water-insolubles from the water-solubles therein and form an aqueous solution of the latter, recovering the bulk of the caffein from the aqueous solution, contacting the remaining aqueous solution with an organic solvent to separate the other water-solubles from the residual caffein therein and form an organic solution of the latter, and recovering the residual caffein from such solution.

2. A method of recovering caffein from a solution obtained by organic solvent extraction of coffee products which comprises contacting the solution with water to separate the water-insolubles from the water-solubles therein and form an aqueous solution of the latter, recovering the bulk of the caffein from the aqueous solution, contacting the remaining aqueous solution with the same organic solvent as used for said extraction to separate the other water-solubles from the residual caffein therein and form an organic solution of the latter, and adding said organic solution to the starting solution.

3. A method of recovering caffein from a solution obtained by organic solvent extraction of coffee products which comprises contacting the solution with water to separate the water-insolubles from the water-solubles therein and form a dilute aqueous solution of the latter, recovering the bulk of the caffein from the aqueous solution, contacting the remaining aqueous solution with an organic solvent to separate the other water-solubles from the residual caffein therein and form an organic solution of the latter, and recovering the residual caffein from such solution.

4. A method of recovering caffein from a solution obtained by organic solvent extraction of coffee products which comprises contacting the solution with water to separate the water-insolubles from the water-solubles therein and form a dilute aqueous solution of the latter, recovering the bulk of the caffein from the aqueous solution, contacting the remaining aqueous solution with the same organic solvent as used for said extraction to separate the other water-solubles from the residual caffein therein and form an organic solution of the latter, and adding said organic solution to the starting solution.

5. A method of recovering caffein from a solution obtained by organic solvent extraction of coffee products which comprises contacting the solution with water to separate the water-insolubles from the water-solubles therein and form an aqueous solution of the latter, purifying the aqueous solution by treatment with activated carbon and crystallizing the bulk of the caffein therefrom, contacting the mother liquor with an organic solvent to separate the other water-solubles from the residual caffein therein and form an organic solution of the latter, and recovering the residual caffein from such solution.

6. A method of recovering caffein from a solution obtained by organic solvent extraction of coffee products which comprises contacting the solution with water to separate the water-insolubles from the water-solubles therein and form an aqueous solution of the latter, purifying the aqueous solution by treatment with activated carbon and crystallizing the bulk of the caffein therefrom, contacting the mother liquor with the same organic solvent as used for said extraction to separate the other water-solubles from the residual caffein therein and form an organic solution of the latter, and adding said organic solution to the starting solution.

7. A method of recovering caffein from a solution obtained by organic solvent extraction of coffee products which comprises contacting the solution with water to separate the water-insolubles from the water-solubles therein and form a dilute aqueous solution of the latter, concentrating the aqueous solution, purifying the concentrated solution by treatment with activated carbon, crystallizing the bulk of the caffein therefrom, contacting the mother liquor with the same organic solvent as used for said extraction to separate the remaining water-solubles from the residual caffein therein and form an organic solution of the latter, and adding said organic solution to the starting solution.

8. A method of recovering caffein from a solution obtained by organic solvent extraction of coffee products which comprises contacting the solution with water to form a dilute aqueous solution of caffein and other water-solubles in which cafestol and other water-insolubles are not dissolved, concentrating the aqueous solution, and recovering the caffein therefrom.

CHARLES RICHARD BENDER.

No references cited.